(12) United States Patent
Reid

(10) Patent No.: US 10,767,888 B2
(45) Date of Patent: Sep. 8, 2020

(54) LIVING ATMOSPHERE CONTROL SYSTEM

(71) Applicant: Brad Reid, Cheltenham (CA)

(72) Inventor: Brad Reid, Cheltenham (CA)

( * ) Notice: Subject to any disclaimer, the term of this patent is extended or adjusted under 35 U.S.C. 154(b) by 261 days.

(21) Appl. No.: 16/014,127

(22) Filed: Jun. 21, 2018

(65) Prior Publication Data

US 2019/0390868 A1    Dec. 26, 2019

(51) Int. Cl.
*B01D 53/62* (2006.01)
*B01D 53/84* (2006.01)
*F24F 3/14* (2006.01)
*F24F 3/16* (2006.01)
*A01G 9/18* (2006.01)
*B64G 1/60* (2006.01)
*F24F 11/72* (2018.01)
*B01D 53/26* (2006.01)

(52) U.S. Cl.
CPC ........... *F24F 11/72* (2018.01); *A01G 9/18* (2013.01); *B01D 53/265* (2013.01); *B01D 53/62* (2013.01); *B01D 53/84* (2013.01); *B01D 2257/504* (2013.01); *B01D 2258/06* (2013.01); *B64G 1/60* (2013.01); *F24F 2203/12* (2013.01)

(58) Field of Classification Search
CPC ...... B01D 53/265; B01D 53/62; B01D 53/84; B01D 2257/504; B01D 2258/06; B01D 2259/4508; F24F 11/71; F24F 2203/12; F24F 2003/1692; F24F 3/14; F24F 3/16; A01G 9/18; B64G 1/60

USPC ....... 55/385.1, 385.2; 454/187, 229; 244/30, 244/171.7
See application file for complete search history.

(56) References Cited

U.S. PATENT DOCUMENTS

| | | | | |
|---|---|---|---|---|
| 5,005,787 A * | 4/1991 | Cullingford | ............... | C02F 9/00 244/171.7 |
| 5,147,429 A * | 9/1992 | Bartholomew | ........ | B01D 46/42 244/30 |
| 5,433,923 A * | 7/1995 | Wolverton | ............... | A61L 9/037 422/121 |
| 5,853,460 A * | 12/1998 | Alcordo | ............. | B01D 53/0407 96/134 |
| 6,727,091 B2* | 4/2004 | Darlington | ............. | B01D 53/85 435/299.1 |
| 2008/0014857 A1* | 1/2008 | Spadafora | ................. | F24F 3/16 454/229 |
| 2009/0158647 A1* | 6/2009 | Kleinwaechter | ..... | A01G 9/1438 47/17 |
| 2015/0282440 A1* | 10/2015 | Shelor | ...................... | A01G 9/18 47/17 |

* cited by examiner

*Primary Examiner* — Minh Chau T Pham
(74) *Attorney, Agent, or Firm* — David W Barman

(57) ABSTRACT

A living atmosphere control system is provided with a primary living area, a green cell containing plants consisting of Boston fern, aloe vera, areca palm, peace lily, and garden mums, at least one inlet configured for transporting oxygen from said green cell into said living area, and at least one outlet configured to transport carbon dioxide from said living area to said dehumidifying coils.

7 Claims, 2 Drawing Sheets

LIVING ATMOSPHERE CONTROL SYSTEM

BACKGROUND OF THE INVENTION

Aerobic respiration is the key to sustaining many life forms on our planet. One of the earliest challenges requiring attention when sending humans into space is sustaining proper levels of oxygen and carbon dioxide. However, in the event that there is an alteration in the oxygen-carbon dioxide exchange process, there is a need for providing a proper environment in order to sustain human life.

There are circumstances, due to various factors, where a person in their own home environment experiences adverse-affects from an alteration in the oxygen levels around them.

Although there are many possible scenarios, a simple, non-limiting example would be a person experiencing respiratory difficulties on a day when ozone levels are elevated. Additionally, because the system (LACS) involves airflow and transfer, it is also suitable at regulating ambient temperature.

SUMMARY OF THE INVENTION

The present invention, referred to as Living Atmosphere Control System (LACS), as described herein, provides significant advantages yet to be disclosed until now.

LACS technology uses living organisms and natural process to condition the air for a building or home.

LACS technology creates a contained multi-cell ecosystem that operates using sunlight and water, and produces only organic biodegradable waste.

LACS technology is adaptable to both warm and cold climates around the globe at different altitudes.

LACS does not require an external fresh air source/intake, and does not need to vent/exhaust any by-products or air pollutants into the atmosphere or external air.

The Living Atmosphere Control System (LACS) is a unique negative pressure whole-home air recycling system. This system creates a symbiotic relationship between occupants and the home. The system is different than other systems because it uses natural processes to heat/dry/and clean the air. In addition to creating oxygen, this system recycles CO2 and normally lost thermal energy. Unlike other forced air heating systems, this negative pressure system draws air into and out of living areas to create airflow. While using all-natural processes to regulate air quality inside the home, this system creates zero emissions and has a neutral impact in the exterior environment while operating.

Fundamentally different than other mainstream residential air quality and temperature control methods, the present invention is completely all natural and utilizes many scientific principals that occur every day in earth's environment. This system uniquely regulates air quality in a contained air loop using these natural processes, but to create an environment conducive for humans while maintaining zero waste.

It is contemplated that the present invention provides any one or combination of the following advantages:

The LACS system is a contained atmosphere and uses negative pressure airflow.

The present invention, in one embodiment, does not use any energy to heat, dry or clean the air.

The present invention, in one embodiment, is a system that makes oxygen as a byproduct. This byproduct is from the cycle whereby the system recycles O2 and CO2 and does not create any new waste. Because of this unique configuration, this system has no impact on the environment when operating.

As stated above, in one embodiment, the system of the present invention is further configured to regulate interior ambient air temperature.

In one embodiment, the system uses small amounts of electricity to suck air between stages of treatment.

The system is configured as a unique contained aerobic exchange system that does not use any flammable fuel or furnace.

Generated waste is contained and reused.

Retains thermal energy from interior air and re-uses water condensed from the air.

The system also re-uses carbon dioxide collected from the air.

In one embodiment, the ratio of dehumidifying coils to cubic feet of living space is 9:200-300, and in one embodiment, 9:220-270. One embodiment provides the ratio of dehumidifying coils to cubic feet of living space is 9:250 or about 360 feet per 10000 cubic feet.

DETAILED DESCRIPTION OF THE PREFERRED EMBODIMENT

Figure 1:
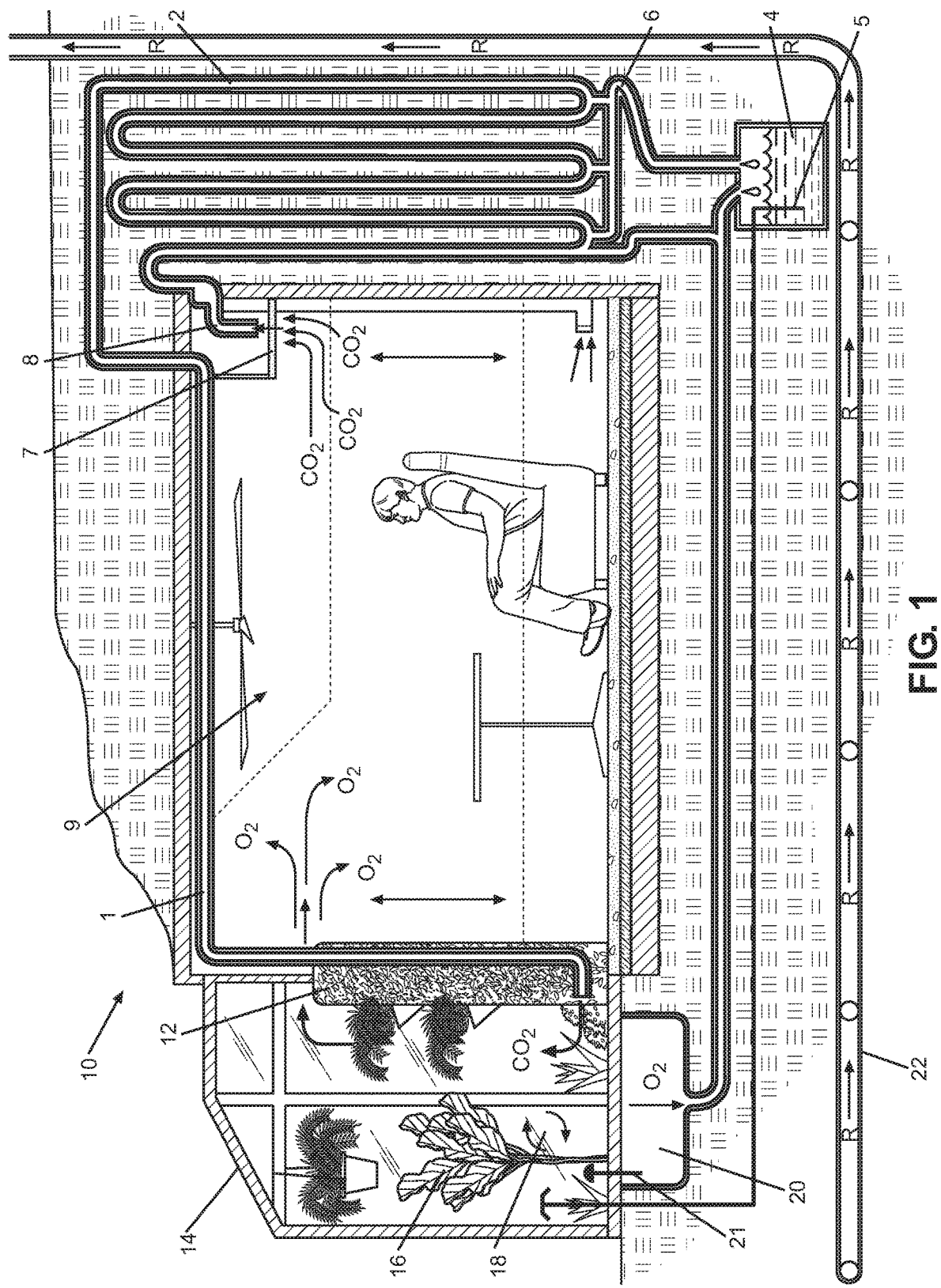
FIG. 1 is a side cross-section of a system configuration according to one embodiment of the present invention.
Figure 2:
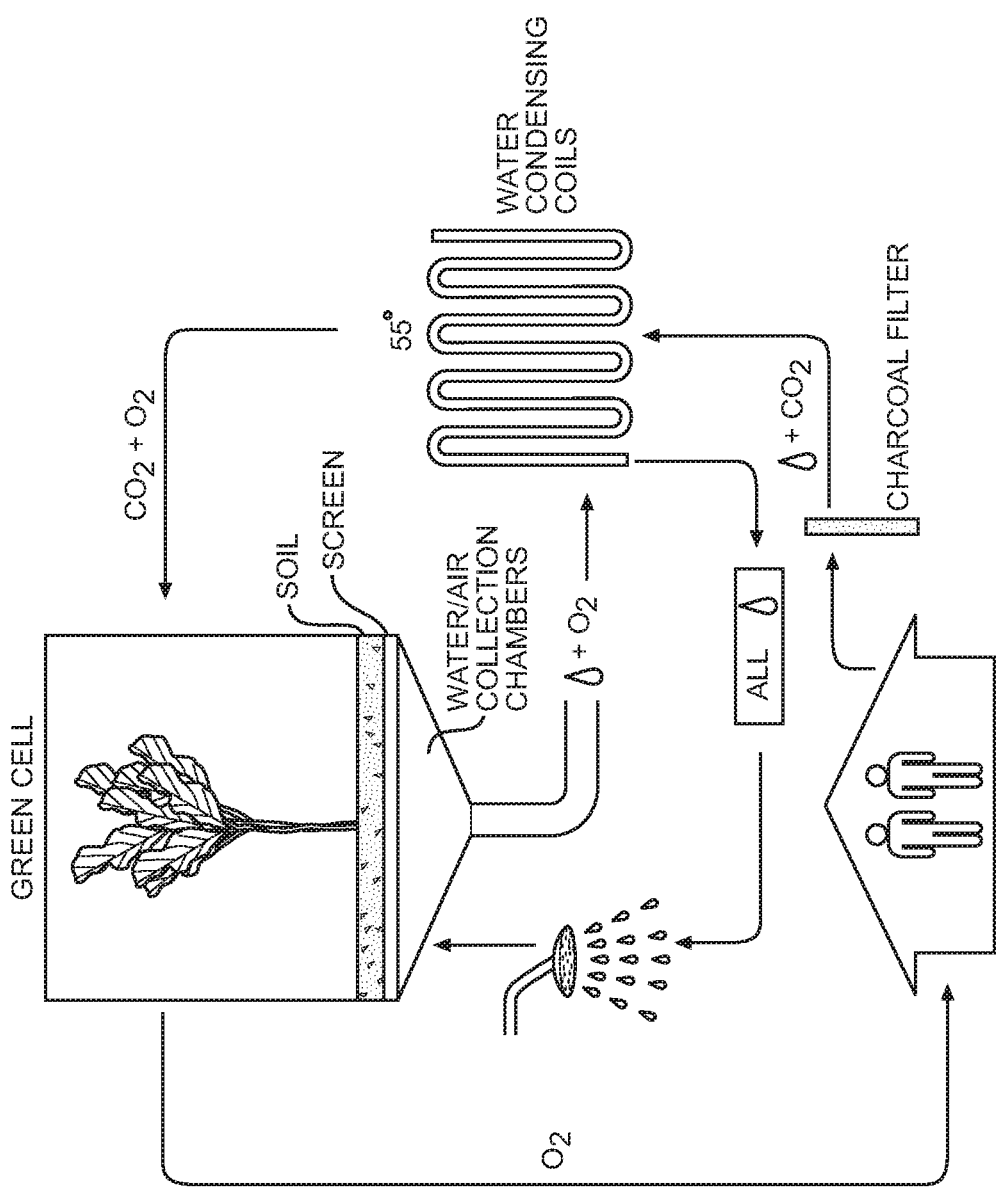
FIG. 2 is a flowchart demonstrative of aerobic exchange according to one embodiment of the present invention.

As generally understood, system 10 is configured as demonstrated in FIG. 1. The figure is provided for illustrative purposes of a particular embodiment and does not necessarily limit the contemplated invention as a whole. Living area 9 is configured with plant wall 12 along at least one wall. Plant wall 12 separates living area 9 from green cell 14. Green cell 14 has contained therein specific plants 16 that are selected based upon being both easy to grow and provide oxygen to the air and clean airborne contaminates. The green cell can have multiple types of plants but must contain the following for they are easy to grow and produce sufficient oxygen for the system to be operable.

Boston fern
aloe vera
areca palm
peace lily
garden mums
neem tree
peepal tree

The amount of above specified plants is selected based upon the number of occupants in living area 9. The amount of plants needed is 400-500 lbs of plant material per person. Alternatively approximately 44,000 leaves per occupant.

Dehumidifying coils 2 are vertically positioned tubes in parallel to each other to form a grid. These underground tube coils increase cool surface area used to condense water vapors from the warm air passing through them. configured to supply 360 feet of 3 inch diameter waterproof tubing per 10,000 cubic feet of living space. They are positioned vertically to allow gravity to force the collected vapors downward and be drained continuously. Plastic waterproof tubing is cooled by the earth's ambient underground temperatures. Placed a minimum of 5 feet below surface level to maintain a minimum temperature of 55 degrees Fahrenheit based on the temperature of soil around the tubes. The tubes provide the critical function of dehumidifying the air passing through them and are environmentally friendly since they require no energy to perform their function. If air is passing through them the coils continuously collect condensed water vapors in liquid form from the air.

Condensed water storage tank 4 condensed water vapors from the dehumidifying coils are collected and stored. The tank is positioned below grade form the coils to allow water to flow into it naturally without power or assistance. The tank holds the water collected in the coils and stores it for draining/use. Made from waterproof and rust proof materials to prevent water from leaking. Condensed water storage tank 4 must be positioned on the opposite side of the coils from the home foundation to prevent any structural decencies in the ground near the home.

The water return line 5 is used to return the collected water vapors form the condensed water storage tank to the green cell portion of the home. Water return line 5 allows water to manually or automatically be drained when the tank becomes full. The line enters the top of the storage tank and reaches the lowest interior point of the condensed water storage to allow it to empty the tanks contents.

Water vapor collecting lines 6 are constructed as small drainage tubes connected to the lowest points of the dehumidifying coils. Water vapor collecting lines 6 are connected to the bottom of all water pooling points of the coils to provide collected water vapors a path of least resistance to flow out of the coils. The water vapor collecting lines 6 are angled relative to the horizontal floor of living chamber 9 to allow the water to flow through them into the condensed water storage tank without assistance or power.

Particle filter 7 is provided. In one embodiment, particle filter 7 is a charcoal particle filter and is configured to prevent entry of solid contaminates in the air to dehumidifying coils. Air must pass through the filter before entering the dehumidifying coils and the blower system and also helps with preventing unwanted odors.

A dehumidifying coil supply line 8 is configured with an air intake position for dehumidifying coils. Located opposite the entry point of the fresh air supply or green cell. The system is configured to create a negative pressure differential in the living area causing air from the greenhouse to be drawn in to fill the void in pressure. By this configuration the system ensures a high intake of $Co_2$ and maintains air is flowing from the greenhouse into the living area. Air entry points are positioned at the highest and lowest points in the rooms. These locations are selected to utilize the thermal layering of the air. By drawing out air from the highest and lowest points of the living area, the area of the thermal layering found most comfortable for human occupancy is maintained. The lines suck air in and blow it through the dehumidifying coils using and electric blowing system. Having the system create a continuous negative pressure difference in the living area is essential to maintaining air quality from fresh oxygen rich air from the green cell is constantly coming in to fill the negative pressure void.

The ambient atmosphere in living area 9 is based on maintaining a negative pressure system. This entire system uses a negative pressure vacuum to combat thermal layering in the air and maintain an artificial airflow or breeze throughout the living area/home continuously.

The air return line 1 is configured to deliver air from the dehumidifying coils to the green cell. The line 1 is closed and does not mix with the living environment air. The line 1 vents dry $CO_2$ rich air from the dehumidifying coils directly to the lower portion of the green cell to be heated and cleaned by plants.

The plant wall 12 is covered in self-draining garden beds that house oxygen-providing plants. The wall does not connect to the ceiling portion of the living area of the home. This allows the wall to increase surface contact between the air and the plants covering it as air is forced to travel up and over the wall towards the living area. The walls main design is to provide a vertical surface to increase the time it takes for the air to flow over it. By doing this it provides an important semi permeable barrier between the green cell and living environment and increases the plants' abilities to effectively metabolize carbon molecules and contaminants from the air before entering the living area. The wall also provides added benefits of retaining thermal energy from the sunlight while allowing some sunlight to still enter the living area because it doesn't connect to the ceiling. Any walk-throughs or breaks in the plant wall must have a draft door installed that also does not connect to the ceiling and ensures air can only flow through the plants over the wall to maintain air quality.

The green cell 14 houses specific plants and provides thermal energy gained from the sunlight. Made almost entirely of glass or a product that allows ultra violet light to pass through it into interior portion of green cell. The green cell is a critical component to the system by maintaining temperature and oxygen levels. During the daytime it generates heat captured from the sun and heats the air inside of it before entering the living area. By providing a suitable environment for plants it can house oxygen-producing foliage all year round. The windows on the green cell open to allow excess heat generated in the summer to be regulated rather than enter the home. This also allows occupants the option of introducing exterior air into the system without compromising the negative pressure vacuum and fresh airflow into the living area.

Green cell atmosphere 18 imparts a greenhouse effect that is multiplied and utilized in the green cell to heat the air and provide suitable growing conditions for the plants without the use of power. The effects are also utilized in the overall environmental system for the human living area. By heating the cool dry $CO_2$ rich air entering the green cell the greenhouse effect heats and evaporates moisture back into the air. As the moist warm air is carried to the top of the green cell through the plants it finds its way over the plant wall into the negative pressure of the living area. As the moist oxygen rich clean air enters the living area to provide breathing air it also warms the living area and provides critical functions to completing the continuous oxygen supply loop.

Soil oxygen basin 20 is configured to function much like a large sink with a semi permeable top to prevent soil from entering the basin, helps maintain air quality and water flow. The lid is made from soil and cloth so it allows air and water to pass through it but not soil. The portion of the basin below the soil lid is pressurized with an air compressor to create enough suction to pull water and air through the lid. The water is drained into the water vapor storage tank and the oxygen rich air is introduced to the dehumidifying coils to be dried out. The air provided from the oxygen basin also contains higher levels of oxygen due to microorganisms present in the soil cleaning and metabolizing air toxins and carbon.

Vents 22 are configured to remove unwanted gasses, such as radon gas and the like. Unwanted and/or dangerous gasses emitted from beneath the home from underground are naturally vented out through the path of least resistance. This radon vent grid collects the gasses that might enter the home and provides them with a path of least resistance to the surface, so they do not ever enter the home. This radon vent system ensures the home remains safe from gas buildups from underground, prevents contamination of the continuous air loop present in the home.

A small air compressor 21 is used to pressurize the oxygen sink basin so that air is pulled from the green cell through the soil of the basin lid and increases oxygen production. The air compressor creates a negative pressure vacuum under the soil to draw air into the oxygen sink basin continuously.

Although the system is continuous and does not have a specific beginning or end to the system process, it will be described as such merely for frame of reference.

The system components are configured as described herein. Plants 16 in green cell 14 produce oxygen as part of normal respiration. Oxygen is carried by active transport imparted by negative pressure of air compressor 21 into oxygen basin 20 and over plant wall 12 into living area 9. A person or persons in living area 9 as part of normal respiration expel higher levels of carbon dioxide. Carbon dioxide and air exits the living area 9 through particle filter 7 and into dehumidifying coil supply line 8. As carbon dioxide and air moves through dehumidifying coil 2, moisture condenses and is ultimately collected into condensed water storage tank 4. The carbon dioxide is returned to green cell 14 through dehumidifying return line 1. Carbon dioxide is used by plants 16 in plant cell 14 for normal plant respiration and the process is continuous.

It should be noted that are approximately 391,000 species of plants. The present invention cannot be trivialized as being a simple selection of a group of plants. The embodiments of the present invention are the results of significant research regarding plant respiration characteristics and synergistic effects of the combinations described herein.

In one embodiment the plant system of the present invention is provided for by the ratio as follows:

Boston fern:Aloe Vera:Peace Lilly:Areca palm:Neem tree:Peepal tree:Garden mums
1:0.4-0.7:0.6-0.9:0.4-0.7:0.4-0.7:0.4-0.7:0.9-1.1.

In another embodiment, the ratio consists of:
1:0.5:0.7:0.6:0.6:0.6:1.0.

Although the composition is also expressed in terms of percentage, the present invention has discovered that the disclosed ratio provides the desired synergistic and complementary characteristics to carry out the present invention.

In one embodiment, the plant species are contained in green cell are as follows:
Boston fern 15-22%
Aloe Vera 8-11%
Peace Lilly 10-16%
Areca palm 10-14%
Neem tree 10-14%
Peepal tree 10-14%
Garden mums 10-14%
In one embodiment, the plant system consists of:
Boston fern 20%
Aloe Vera 10%
Peace Lilly 14%
Areca palm 12%
Neem tree 12%
Peepal tree 12%
Garden mums 20%

In one embodiment, the plant wall is covered entirely on the green cell side and the top. This would mean roughly 50% of the wall is covered. The side facing the green cell and sunlight is the only portion of wall with plants. The distance between the top of the plant wall and the ceiling will be 36-42 inches or 3-3½ feet.

In one embodiment, the windows on the green house will most likely be manual but an automatic version built into thermostat that opens when it reaches a certain temperature has been considered. They will be electric or manual depending mainly on the users preference and budget.

In one embodiment, the invention provides 2650 ft of living space and 23,904 cubic feet. It is preferred that there be approximately 25 air volume changes per hour. The present invention has discovered this exchange rate is effective at diluting air-born. microorganisms in rooms with human activity.

The invention is configured as using either multiple in-duct blower fans at three points of the system or one larger one. Regardless of fan placement or layout, the invention functions utilizing the negative pressure principals of the system. A negative pressure inlet in the rear of living area and positive pressure outlet in the green cell are consistently running to maintain air flowing between the plant cell and the living area.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A living atmosphere control system comprising;
a primary living area;
a green cell containing plants consisting of Boston fern, aloe vera, areca palm, peace lily, and garden mums;
said green cell containing the ratio of plants, Boston fern:Aloe Vera:Peace Lilly:Areca palm:Neem tree:Peepal tree:Garden mums being
1 Boston Fern:0.4-0.7 Aloe Vera:0.6-0.9 Peace Lilly:0.4-0.7 Areca palm:0.4-0.7 Neem tree:0.4-0.7 Peepal tree: 0.9-1.1 Garden mums;
at least one inlet configured for transporting oxygen from said green cell into said living area;
a plant wall configured to increase the contact of said air in said green cell before entering said living area;
at least one outlet configured to transport carbon dioxide from said living area to said dehumidifying coils;
at least one outlet configured to transport said air from said dehumidifying coils to said green cell;
an oxygen sink basin having a lid;
an air compressor configured to pressurize said oxygen sink basin configured to pull air from said green cell through soil of said basin lid resulting in increased oxygen production.

2. The living atmosphere system of claim 1, wherein said inlet configured for transporting oxygen from said green cell into said living area circulates atmospheric volume in said living area 25 times per hour.

3. The living atmosphere system of claim 1, wherein said ratio of plants, Boston fern:Aloe Vera:Peace Lilly:Areca palm:Neem tree:Peepal tree:Garden mums is 1 Boston fern: 0.5 Aloe Vera:0.7 Peace Lilly:0.6 Areca palm:0.6 Neem tree:0.6 Peepal tree:1.0 Garden mums.

4. The living atmosphere system of claim 1, wherein said green cell contains 400-500 pounds of plants per person occupying said living area.

5. The living atmosphere system of claim 1, wherein said living area is configured with 1-3 fans configured to impart negative pressure at said inlet in the rear of living area.

6. The living atmosphere system of claim 1, wherein said ratio of dehumidifying coils to cubic feet of living space is 9 dehumidifying coils:200-300 cubic feet of living space.

7. The living atmosphere system of claim 1, wherein said ratio of dehumidifying coils to cubic feet of living space is 9 dehumidifying coils:220-270 cubic feet of living space.

\* \* \* \* \*